(12) United States Patent
Kuhm et al.

(10) Patent No.: US 12,153,410 B2
(45) Date of Patent: Nov. 26, 2024

(54) METHOD FOR APPLYING AN OPTIMIZED PROCESSING TREATMENT TO ITEMS IN AN INDUSTRIAL TREATMENT LINE AND ASSOCIATED SYSTEM

(71) Applicant: Henkel AG & Co. KGaA, Duesseldorf (DE)

(72) Inventors: Peter Kuhm, Hilden (DE); Frank Krude, Duesseldorf (DE); Christian Rosenkranz, Duesseldorf (DE); Christian Stromberg, Duesseldorf (DE); Christoph Waloch, Langenfeld (DE)

(73) Assignee: HENKEL AG & CO. KGAA, Duesseldorf, NY (US)

( * ) Notice: Subject to any disclaimer, the term of this patent is extended or adjusted under 35 U.S.C. 154(b) by 338 days.

(21) Appl. No.: 17/636,789

(22) PCT Filed: Aug. 20, 2020

(86) PCT No.: PCT/EP2020/073429
§ 371 (c)(1),
(2) Date: Feb. 18, 2022

(87) PCT Pub. No.: WO2021/037693
PCT Pub. Date: Mar. 4, 2021

(65) Prior Publication Data
US 2022/0276644 A1    Sep. 1, 2022

(30) Foreign Application Priority Data

Aug. 23, 2019    (EP) .................................... 19193412

(51) Int. Cl.
*G05B 19/418*    (2006.01)

(52) U.S. Cl.
CPC .................. *G05B 19/41875* (2013.01); *G05B 2219/32015* (2013.01)

(58) Field of Classification Search
None
See application file for complete search history.

(56) References Cited

U.S. PATENT DOCUMENTS 6,604,012 B1    8/2003    Cho et al.
2019/0377334 A1*  12/2019  Nakamura ............. G06Q 10/06

FOREIGN PATENT DOCUMENTS

WO    2010132998 A1    11/2010
WO    2018154799 A1    8/2018

* cited by examiner

*Primary Examiner* — Ryan A Jarrett
(74) *Attorney, Agent, or Firm* — Lorenz & Kopf, LLP

(57) ABSTRACT

A method and associated system for applying an optimized processing treatment to items in an industrial treatment line are described. First, settings for a value of a working parameter in the treatment line are defined. The settings are associated with value ranges of a parameter representative of an external property of items. Then, a value of the parameter representative of the external property of the item is measured. A setting for the value of the working parameter associated with a value range from the set of value ranges comprising the measured value is compared to the current setting of the working parameter. When a difference is detected between the associated setting and the current setting, the current setting is changed to the associated setting.

14 Claims, 3 Drawing Sheets

METHOD FOR APPLYING AN OPTIMIZED PROCESSING TREATMENT TO ITEMS IN AN INDUSTRIAL TREATMENT LINE AND ASSOCIATED SYSTEM

CROSS-REFERENCE TO RELATED APPLICATION

This application is a U.S. National-Stage entry under 35 U.S.C. § 371 based on International Application No. PCT/EP2020/073429, filed Aug. 20, 2020, which was published under PCT Article 21(2) and which claims priority to European Application No. 19193412.4, filed Aug. 23, 2019, which are all hereby incorporated in their entirety by reference.

TECHNICAL FIELD

The present disclosure relates to the field of processing of items in an industrial treatment line. The present disclosure is more particularly adapted for applying processing treatments such as for example cleaning, disinfecting, coating mechanical parts after completion of their manufacturing process, in a customized and economical way.

BACKGROUND

The manufacturing of items, in particular industrial parts such as for example car wheel rims, 3D printed parts, car frames, car doors or other industrial parts that are produced in the automotive industry or other industries involving industrial manufacturing lines, generally comprise processing steps for improving the overall quality of the parts after their manufacturing is complete. These processing steps can, for example, involve application of a protective coating layer, one or more cleaning steps involving, for example, a chemical bath, drying or polishing.

An industrial treatment line generally comprises one or more processing modules. Items (also called "parts" or "industrial parts") are carried from one processing module to the next along the industrial treatment line.

Generally, industrial manufacturing and processing facilities are designed to handle a large number of parts. A typical assumption is that all parts are identical, or at least have substantially similar features so that the settings of the working parameters within each processing module can be fixed or pre-programmed.

Processing modules are generally parameterized to process all items of an industrial treatment line using predefined and fixed working parameters. The term "working parameters" is used to describe settings used in a processing module, such as for example: the operating temperature, which might be adjusted with a heating element for example, the concentration of a cleaning agent inside a bath which can, for example, be controlled by the dosage of an additive, the pressure inside the processing module, the time the item spends inside the processing module. The term "working parameters" can also encompass measurable values of a physical parameter inside the processing module such as, for example, the temperature, pressure, conductivity, pH, redox potential.

The standardized approach to the processing of industrial parts along an industrial treatment line can lead to errors, in particular when conditions inside processing modules change and require adapting settings in order to maintain a certain quality of the processing treatment applied to items in the industrial treatment line.

One solution to prevent errors which can impede the quality and profitability of the treatment applied to items consists in dynamically monitoring the conditions inside the processing modules of a treatment line. This is the approach provided by Lineguard®, a monitoring tool developed by Henkel® which measures different parameters within processing modules of an industrial treatment line and records them to provide an insight into the way a treatment line operates as a function of time. In order to measure parameters such as temperature, pressure, conductivity, pH, redox potential in processing modules of an industrial treatment line, Lineguard® provides kits including sensors, probe-collecting circuitry, pumps, electrodes, developed to adapt to the specific environment of processing modules in industrial production lines and provide an accurate value of the current state of a processing module without impacting its functionality in a negative way.

Lineguard® comes in particular with a control unit that can store all measurements done on the industrial treatment line and provide access to these measurement to users, for example via cloud applications. Lineguard® can in particular comprise warning systems that alert users when certain parameters exceed threshold values or ranges that are pre-programmed in the control unit. This allows users of Lineguard® to then manually adapt the settings of the working parameters in processing modules along the industrial treatment line.

Despite the benefits brought by Lineguard®, processing modules are only configured to process all items using identical working parameters, regardless of possible differences between individual items or batches along the treatment line. The assumption that all items have identical or substantially identical features is generally accurate, but it can lead to individual parts not being treated with the same quality as the others.

In order to reduce the likelihood that some items will not be treated as thoroughly as expected, processing modules are configured to operate with working parameters that are set at values above the average value required to apply the desired treatment to an industrial part. This however leads to an undesired waste of resources and still does not completely prevent individual items from exiting the treatment line with an unsatisfactory level of treatment. This can for example occur in case of larger than usual items or items that have been subjected to extensive corrosion when stored in a warehouse prior to receiving the treatment.

For the above reasons, a method for applying an optimized processing treatment to items in an industrial treatment line is sought.

BRIEF SUMMARY

A method and associated system for applying an optimized processing treatment to items in an industrial treatment line includes defining settings for a value of a working parameter in the treatment line. The settings are associated with value ranges of a parameter representative of an external property of items. A value of the parameter representative of the external property of the item is measured. A setting for the value of the working parameter associated with a value range from the set of value ranges comprising the measured value is compared to the current setting of the working parameter. When a difference is detected between the associated setting and the current setting, the current setting is changed to the associated setting.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

To address the above need, the present disclosure provides a method for applying an optimized processing treatment to items in an industrial treatment line, the industrial treatment line comprising at least one processing module applying a processing treatment to the items, the processing treatment being at least in part parameterized by a current setting of at least one working parameter of the at least one processing module, the method comprising:

(a) defining, for a set of value ranges of at least one parameter representative of an external property of items in the industrial treatment line, associated settings for a value of the at least one working parameter, each value range being associated with an associated setting and wherein each associated setting corresponds to a setting compatible with an achievement of a target quality of the processing treatment;

(b) measuring, on an item from the industrial treatment line, a value of the at least one parameter representative of the external property of the item;

(c) identifying a value range, among the set of value ranges of the at least one parameter representative of an external property of items in the industrial treatment line, comprising the measured value and comparing an associated setting for the value of the at least one working parameter with the current setting of the at least one working parameter; and (d) upon detecting a difference between the associated setting and the current setting, changing the current setting to the associated setting.

This method uses measurements performed on an item, to determine whether it can be treated with a setting of a working parameter in the processing module, differing from the current setting, that saves energy and resources while still allowing achievement of a desired target quality of the processing treatment.

To do so the method uses information that can be provided by a database or from input by a user for example, establishing a list of value ranges for values of a parameter representative of an external property of an item (such as for example its shape, its dirtiness level, its material composition, its size, the thickness of a coating layer, the number or presence of soilings on the surface of the item). Each value range is associated with a value of a working parameter that is predicted in the database or from the input from a user to be energy efficient and/or to consume few resources in the processing module while still enabling treatment of an item with a satisfactory quality level. It is further possible to dynamically update this database based on previous recordings of the functioning of the processing module.

The "target quality" of the treatment can for example be set as a percentage of defects that are removed from the item, such as less than 10 or less than 5 stains or soilings on the surface of the item. A quality can also be seen as a difference in the value of the parameter representative of an external surface of the item across the external surface of the item that is less than 25% or less than 10% or less than 5% of the maximum value of that parameter measured on the surface of the item. In other words, the "quality" can also be a measure of the homogeneity of the external surface of an item. A quality of the treatment can also be seen as a difference in the value of the external parameter with respect to the value measured on a reference item that is less than 25% or less than 10% or less than 5% or less than 1%. The reference item is an item that has a value for the external parameter that is considered to be within the target quality, for example a sufficiently clean and homogeneously clean, exemplary of the item.

"Resources" can for example refer to the volume of cleaning agents dispensed per item, the duration during which spraying units dispensing a treatment to the items were switched on, the number of spraying units that were activated per item, the time spent by an item in each processing module.

"Energy" can for example include the number of watts or watthours of electricity consumed at each processing module, or the number of Joules spent changing the temperature in a processing module. For example, "energy" provides an indication of the consumed electrical energy per items processed in the industrial treatment line. Energy can also define the energy used per item based on the power required to process the item and the time spent by the item in the processing module.

The settings of the working parameter are generally split into different fixed values or a continuum of values for each working parameter. In some embodiments, the settings can be controlled by a selector of values such as a knob or an equivalent selector to navigate across the space of accessible values for the working parameter. An "extreme" setting is understood as being a value that cannot be further increased or decreased without changing the existing arrangement of components inside the processing unit, for example by adding new components such as new dispensing units, more heaters, more aggressive cleaning agents, or by programming a further value or range of values for the selector of values for the working parameter on the controls of the processing module.

According to an embodiment, the current setting can be changed to the associated setting upon further determining that the value of the working parameter in the current setting differs by more than 25% from the value of the working parameter in the associated setting.

According to an embodiment, each associated setting may correspond to a setting compatible with an achievement of a target quality of the processing treatment and wherein the associated setting corresponds to one among: a setting for which consumption of resources and/or energy at the at least one processing module is lower than a consumption of resources and/or energy obtained with an extreme setting of the at least one working parameter; and a setting for which a lowest achievable consumption of resources and/or energy at the at least one processing module is achieved.

The associated setting for which a lowest achievable consumption of resources and/or energy at the at least one processing module is achieved can sometimes be the highest possible setting, also called "extreme" setting as defined above, if it is the only one that enables reaching the target quality of the treatment.

According to an embodiment, the method may further comprise:

measuring, at predetermined time intervals on items in the industrial treatment line, a value of the at least one parameter representative of the external property of the items;

identifying, for each item for which a measurement is performed, a value range, among the set of value ranges of the at least one parameter representative of an external property of items in the industrial treatment line, comprising the measured value and comparing an associated setting for the value of the at least one working parameter with the current setting of the at least one working parameter; and upon detecting a difference between the associated setting and the current setting, changing the current setting to the associated setting.

According to an embodiment a value of the at least one parameter representative of the external property of items may be measured for each item in the industrial treatment line.

According to an embodiment, the parameter representative of an external property of items may be one among:
- a size of the item;
- a shape of the item;
- a color of the item;
- a level of corrosion of a surface of the item;
- a level of dirtiness of the surface of the item;
- a shininess of the item;
- a number of structural differences identified on the item compared to a reference exemplary of the item;
- a concentration of metal deposited on the surface of the item;
- a thickness of a coating layer on the surface of the item.

According to an embodiment, the at least one working parameter may be chosen from among:
- a duration of the processing treatment applied to the item in the at least one processing module;
- a temperature applied to items in the at least one processing module;
- a concentration of at least one cleaning agent in a bath inside the at least one processing module;
- a pressure exerted by a fluid onto items inside the at least one processing module;
- an amount of dispensing units activated for dispensing a cleaning agent onto items inside the at least one processing module.

According to an embodiment, the industrial treatment line may further comprise a storage area for storing the items, the method further comprising:
- measuring a value of a parameter representative of a condition inside the storage area;
- defining, for a set of value ranges of the parameter representative of the condition, corresponding settings for a value of the at least one working parameter;
- identifying a value range, among the set of value ranges of the parameter representative of the condition, comprising the measured value of the parameter representative of the condition inside the storage area and comparing the corresponding setting with the current setting; and
- upon detecting a difference between the corresponding setting and the current setting, changing the current setting to the corresponding setting.

In particular the parameter representative of a condition inside the storage area may be chosen from among:
- a humidity level inside the storage area, to which items are exposed;
- an atmospheric pressure;
- a time spent by items inside the storage area;
- a temperature inside the storage area,
- presence and/or concentration of pollutants in the storage area.

The term "pollutants" can for example refer to compounds that can affect the cleanliness of the external surfaces of items such as dust particles, other particulates such as pollen, soot, smoke, ashes, water droplets, oil droplets, nanoparticles and microparticles produced by car traffic or industrial activity.

According to an embodiment, the method may further comprise:
- defining item categories for items in the industrial treatment line based on the set of value ranges of at least one parameter representative of an external property of items in the industrial treatment line, each value range being associated with a corresponding item category;
- prior to entering the treatment module, grouping each item from the industrial treatment line into a corresponding item category based on a measured value for the at least one parameter representative of the external property of the item;
- selecting an item category and setting the at least one working parameter to a value within the value range associated with the selected item category; and
- directing items belonging to the selected item category into the at least one processing module.

By sorting items according to categories, it is possible to reduce the number of times that the settings of the working parameter or working parameters need to be changed. Indeed, when items have substantially identical features, they can all be processed by applying a treatment with identical settings for the working parameter or parameters in the processing module. Settings will then only be changed when a new batch of items having different features is carried along the industrial treatment line.

According to an embodiment, the method may further comprise:
- obtaining a target range of values for the value of the at least one parameter representative of the external property of the item;
- measuring, downstream from the processing module, the value of the at least one parameter representative of the external property of the item;
- comparing the measured value to the target range of values;
- upon detecting that the measured value is outside of the target range of values, directing the item into the at least one processing module to repeat steps /b/ to /d/.

The present disclosure also pertains to a system for applying an optimized processing treatment to items in an industrial treatment line, the industrial treatment line comprising at least one processing module applying a processing treatment to the items, the processing treatment being at least in part parameterized by a current setting of at least one working parameter of the at least one processing module, the system comprising:
- at least one first sensor configured to measure, on an item from the industrial treatment line, a value of the at least one parameter representative of the external property of the item;
- at least one data processing device configured to receive the measurement from the at least one first sensor and to:
  (a) receive and/or store input defining, for a set of value ranges of at least one parameter representative of an external property of items in the industrial treatment line, associated settings for a value of the at least one working parameter, each value range being associated with an associated setting and wherein each associated setting corresponds to a setting compatible with an achievement of a target quality of the processing treatment;
  (b) compare an associated setting from the input for the value of the at least one working parameter associated with a value range from the set of value ranges comprising the measured value of the at least one parameter representative of the external property of the item to the current setting of the at least one working parameter; and (c) upon detecting a difference between the associated setting and the current setting, outputting an instruction to change the current setting to the associated setting at the at least one processing module.

Such a system is particularly suitable to implement the method described above.

According to an embodiment, the system may further comprise:

a storage area for storing items prior to entering the at least one processing module;

at least one second sensor configured to measure a value of a parameter representative of a condition inside the at least one processing module.

The term "condition" inside the at least one processing module refers for example to parameters such as those described above with respect to the method of the present disclosure.

According to an embodiment, the method may further comprise:

a by-pass channel configured to direct items from the industrial treatment line away from the at least one processing module upon determining that the items belong to an item category incompatible with the at least one working parameter set for the at least one processing module.

A by-pass channel for items can allow saving time and resources by not applying treatments when they have been identified as not being needed to processing the item.

According to an embodiment, the method may further comprise:

at least one third sensor arranged on the treatment line downstream from the at least one processing module, the at least one third sensor measuring the value of the at least one parameter representative of the external property of the item downstream from the at least one processing module;

a feedback channel configured to redirect items from the industrial treatment line back into the at least one processing module upon determining that the value measured by the at least one third sensor is outside of a target range of values.

The term "target range of values" refers to a range of values that corresponds to values for parameters representative of an external property of the item associated with a satisfactory quality of treatment, in particular a quality of treatment that can be defined as reaching the "target" quality of treatment for example mentioned above.

The present disclosure also targets a non-transitory computer readable storage medium having stored thereon a computer program comprising instructions for execution of a method for applying an optimized processing treatment to items in an industrial treatment line, the industrial treatment line comprising at least one processing module applying a processing treatment to the items, the processing treatment being at least in part parameterized by a current setting of at least one working parameter of the at least one processing module, the method comprising:

(a) receiving instructions defining, for a set of value ranges of at least one parameter representative of an external property of items in the industrial treatment line, associated settings for a value of the at least one working parameter, each value range being associated with an associated setting and wherein each associated setting corresponds to a setting compatible with an achievement of a target quality of the processing treatment;;

(b) receiving a measurement of a value of the at least one parameter representative of the external property of an item from the industrial treatment line;

(c) comparing an associated setting for the value of the at least one working parameter associated with a value range from the set of value ranges comprising the measured value of the at least one parameter representative of the external property of the item to the current setting of the at least one working parameter; and (d) upon detecting a difference between the associated setting and the current setting, outputting an instruction to change the current setting to the associated setting at the at least one processing module.

In other words, the present disclosure targets a computer program product capable of implementing steps of the method as described above.

BRIEF DESRIPTION OF THE DRAWINGS

The present disclosure will hereinafter be described in conjunction with the following drawing figures, wherein like numerals denote like elements, and:

DETAILED DESCRIPTION

The present disclosure provides a method which simplifies the management of settings in processing modules of an industrial treatment line, in order to reduce the resources used to process industrial parts or items, while at the same time still reaching a desired quality of the processing treatment applied to the items.

The present disclosure can be applied to items in many different industries, such as for example spare parts in the automotive industry, in the household appliance industry, in the electronic component manufacturing industry, in the consumer goods industry.

Figure 1:
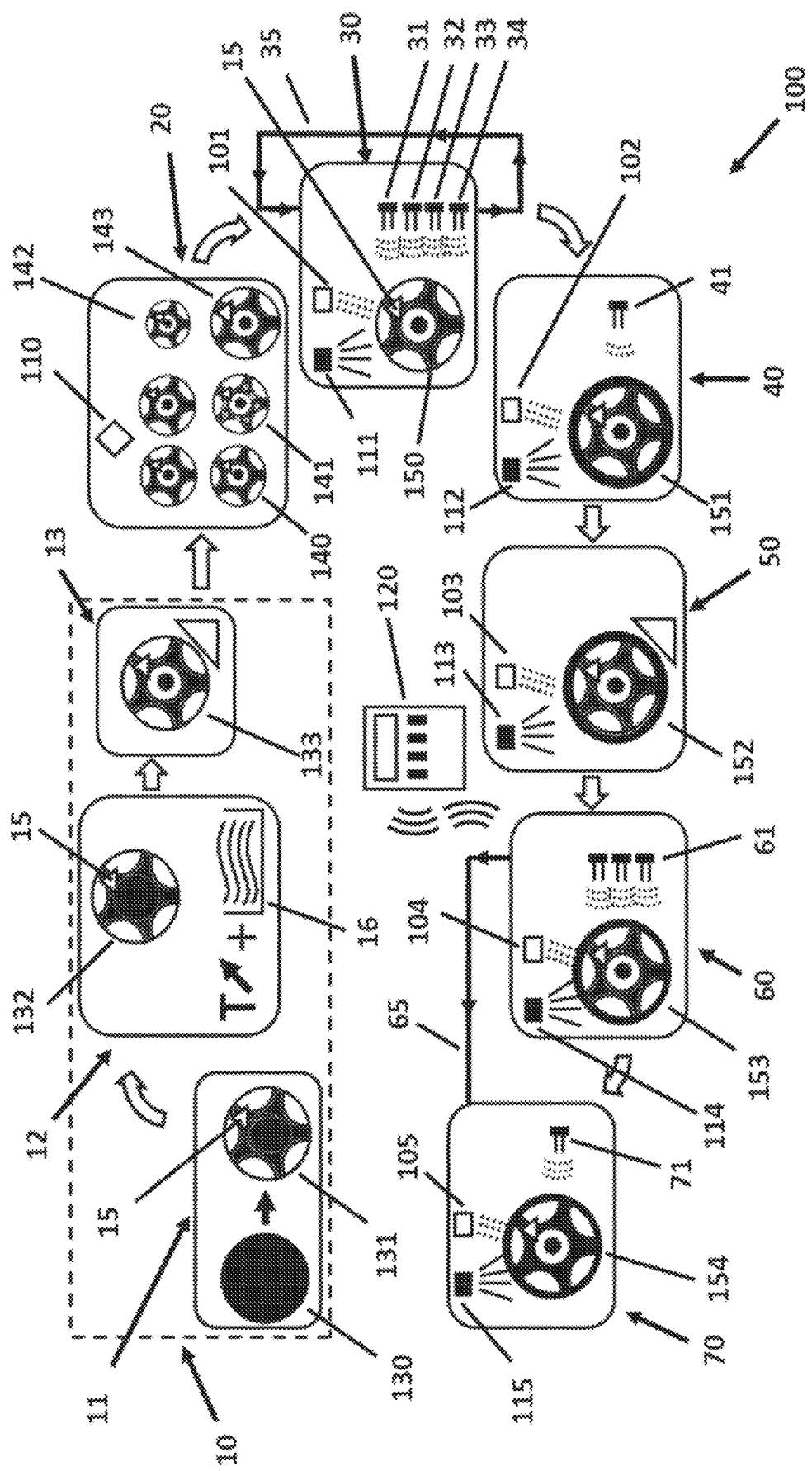
FIG. 1 is a schematic representation of an industrial treatment line comprising processing modules capable of implementing a method according to an exemplary embodiment.

Generally, industrial production of parts or items involves a manufacturing step followed by a processing step. FIG. 1 schematically represents an industrial treatment line 100 which comprises a manufacturing section 10 and a plurality of processing modules 20, 30, 40, 50, 60, 70.

The manufacturing section 10 typically comprises a molding or casting module 11 in which a raw part 130 is first casted/mold into a first shape 131. The first shape 131 may at this stage or at a later stage be fitted with an identification means 15, such as for example a bar code, QR code, serial number or any recognizable feature engraved on one of the surfaces of the item. The first shape 131 is then subjected to chemical and physical treatment in a heating and/or dipping module 12, which can for example comprise the application of an elevated temperature to the first shape 131 followed by a dipping in a bath filled with a liquid set at a lower temperature, to generate a second shape 132. The second shape is then subjected to a mechanical treatment such as for example a polishing and/or abrasive treatment in a polishing module 13. This creates a manufactured item 133.

In the example illustrated in FIG. 1, the manufactured part is a car wheel rim. However, the teachings of the present disclosure can easily be applied to any other type of manufactured item.

Once the manufactured item 133 is subjected to the polishing and/or abrasive treatment, it is typically stored in a storage area in a processing module 20 configured for storing items 140, 141, 142, 143. As illustrated in FIG. 1, the storage area may house items having different shapes or levels of soiling. In the example of FIG. 1 item 143 is bigger than most other items 140, 141. Item 142 is smaller than most other items 140, 141. Item 141 is subjected to a higher level of soiling than other items 140, 142, 143.

In order to determine the conditions to which items 140, 141, 142, 143 are subjected, the present disclosure acquires data corresponding to a value of a parameter representative of a condition inside the storage are. This value can advantageously be monitored over time. A sensor 110 is used to measure this value. Sensor 110 will be referred to as "second sensor 110" because similar sensors can be used further down the industrial treatment line 100 to measure similar values of parameters representative of a condition inside a processing module, and the second sensor 110 generally is the second measuring device used at a processing module 20, 30, 40, 50, 60, 70 even though its presence remains optional.

Among possible parameters representative of a condition inside the storage area, the second sensor 110 can measure a humidity level inside the storage area, the atmospheric pressure, a time spent by items 140-143 in the storage area, a temperature inside the storage area, presence of pollutants in the storage area which can for example increase corrosion or deposition of soiling on the external surface of the stored items. Among pollutants that can affect the cleanliness of the external surfaces of the items 140-143 include dust particles, other particulates such as pollen, soot, smoke, ashes, water droplets, oil droplets, nanoparticles and microparticles produced by car traffic or industrial activity. The second sensor 110 may also measure the presence and quantity of microbes such as bacteria on the external surfaces of the items 140-143.

The second sensor 110 or another additional sensor (not represented in processing module 20 in FIG. 1) can further determine a value of a parameter representative of an external property of items in the industrial treatment line. Such a parameter representative of an external property of items can for example be a value of: a size of the item 140-143, a shape of the item 140-143, a color of the item, a level of corrosion of a surface of the item, a level of dirtiness of the surface of the item, a shininess of the item, a number of structural differences identified on the item compared to a reference exemplary of the item, a concentration of metal deposited on the surface of the item, a thickness of a coating layer on the surface of the item.

This information can be used in order to sort items 140-143 out according to their external features, since these features influence the intensity of the processing treatment that needs to be applied to the items 140-143 in order to reach a target quality. For example, a smaller item such as item 142 in FIG. 1 requires less cleaning agents to be applied on its external surface than item 143, assuming both have the same level of dirtiness per surface area. Dirtier items such as item 141 require a more intensive processing treatment than item 140 having the same size.

In order to sort items 140-143 out, different categories are advantageously defined, with sets of value ranges for the measured value of the parameter representative of an external property of the items. Items can in particular be grouped together according to each category, in order to direct them further along the processing modules 30, 40, 50, 60, 70 in batches that require similar processing treatment intensities. This reduces the number of times that settings for working parameters of machines applying treatments to items need to be changed, which saves energy.

The sorting out of items 140-143 into corresponding item categories is however optional, since further sensors can be used to determine the right settings for the specific measured values of the parameter or parameters representative of the external property of items 140-143, and since optionally, each item 140-143 can also be identified individually via its unique identification means 15. The unique identification means 15 can be used to trace an item and adjust the settings of working parameters at each processing module 20, 30, 40, 50, 60, 70 based on parameters of the items such as their shape, the material in which they are made, their size, their color, the maximal temperature or pressure or concentration of specific chemical agents to which the item can be exposed.

Figure 2:
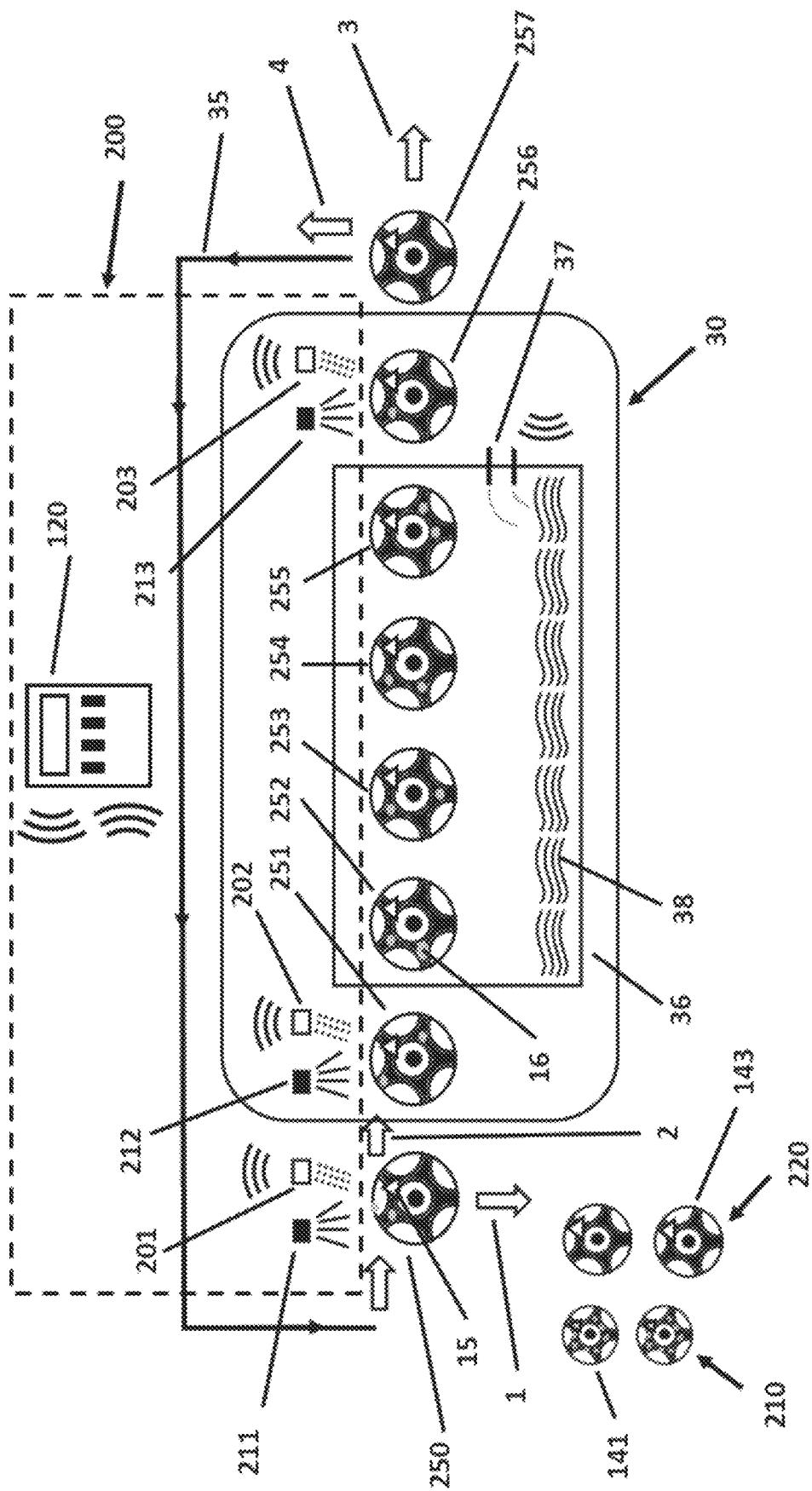
FIG. 2 is a schematic representation of a processing module configured to implement a method according to an exemplary embodiment.

Items 140-143 are then channeled further along the industrial treatment line 100 to processing module 30, an alternative version of which is also illustrated in further detail in in FIG. 2.

As seen in FIG. 1, processing module 30 is a pre-treatment module which typically applies a cleaning treatment to the items. The cleaning can for example be a spraying of a cleaning agent or a spraying of a mixture of cleaning agents onto the items, a dipping of the items into a bath comprising a liquid with a certain adjustable concentration of cleaning agents, a thermal treatment comprising in exposing items to high temperature or to different temperature ranges to facilitate peeling of possible deposits on the surface of the items, or a pressure treatment comprising in exerting a pressure on the items to modify their shape and/or peel off deposits using a pressurized fluid or by putting the items into a pressurized chamber.

As shown in FIG. 1, several spraying units 31-34 can be activated to dispense a cleaning agent onto the external surface of an item.

The setting of the processing module 30, which is referred to as the setting of the value of at least one working parameter within the processing module 30, is selected based on a measured value of a parameter representative of an external property of an item 150 entering the processing module 30. In the example represented in FIG. 1, the parameter is measured using a sensor 101 which is configured to detected light scattered by a surface of the item 150, in particular light emitted by a light source 111. Sensors 101-105 are referred to as "first sensors 101-105" as they are used generally either upstream from a processing module 20, 30, 40, 50, 60, 70 or inside such processing modules 20, 30, 40, 50, 60, 70. Properties of the first sensor 101 and the associated light source 111 can advantageously be adapted to measure the same type of parameters of the external property of the item 150 as mentioned above in connection with processing module 20. The same also applies to all the other first sensors 102-105 as well as the associated light sources 112-115.

In order to measure such parameters, the sensor 101 can for example be an optical detector associated with a light source 111 emitting light preferentially in the ultraviolet (UV) and/or visible and/or infrared (IR) spectral range. The optical detector also detects light in the UV and/or IR and/or visible range. The ultraviolet range typically comprises wavelengths between 10 nm and 400 nm, more particularly between 200 nm and 400 nm, the visible range typically comprises wavelengths between 400 nm and 800 nm and the IR range typically comprises wavelengths between 800 nm and 1 mm, more particularly from 800 nm to 2 µm, which corresponds to the near-infrared. The sensor 101 can further be a spectrometer configured to detect a spectrum representative of a chemical substance from light reflected and scattered by a surface of the items 140-143, and to determine a concentration of that chemical substance on the item.

Alternatively, the sensor 101 could also for example be a camera taking a picture of the item 150, the camera being preferentially set at a predetermined distance from the item 150 or configured to rescale pictures in order to be able to determine the size of the item 150 and/or to compare the picture of the item 150 with a reference picture of a similar item, in order to count the number of defects identified on the picture of the item 150. The number of defects can for example be a number of protrusions/recesses counted on the external surface of the item 150 as seen on the picture, or the percentage of the surface for which the color or shininess differs from that of the reference picture. The number of defects can also be determined on a portion of the external surface of the item 150 and/or be expressed globally as a number of defects per unit area.

The sensor 101 can also be a detector measuring either the light directly reflected and or scattered by the items, or a fluorescent light, that is reemitted by items almost immediately after illumination by the light source.

Other sensors such as for example chemical sensors or electronic noses, mechanical sensors such as weights can also be used.

FIG. 2 provides a detailed view of another example of a processing module 30 adapted for cleaning items 250-257. In this example, an initial value of a parameter representative of an external property of the items 250-257 is measured upstream from the processing module, using sensor 201 and optionally light source 211. As shown in FIG. 2, item 250 can then be redirected to another storage area 1 to be arranged together with other items 141, 143 depending on the item category 210, 220 to which item 250 is identified as being related to.

When redirected 1 to another storage area, treatment of item 250 is put on hold until the settings of the processing module are changed in order to be adapted to the features of the item category 210, 220 to which it belongs.

This sorting out of items 250-257 is however an optional feature of the present disclosure, just as the use of an initial measurement performed upstream of the processing module 30.

Upon entering 2 the processing module 30, a first measurement of a value of a parameter representative of an external property of the item 251 can be performed. This can either relate to a different parameter than the one measured as the initial value upstream of the processing module 30 and/or be the first measurement that is performed if sensor 201 is not present. The measurement is performed with a first sensor 202 and optionally light source 212. As represented in FIG. 2, each sensor (sensor 201, first sensor 202 and third sensor 203) is capable of sending information to a data processing device 120. It should be further noted that each processing module 20, 30, 40, 50, 60, 70 may further comprise a second sensor 110 measuring a value of a parameter representative of a condition inside the processing module 20, 30, 40, 50, 60, 70. More than one or two first sensors can be present, in order to measure values of different parameters representative of an external property of the item.

Data processing device 120 can either be a control unit set somewhere near the industrial treatment line 100, or be a remotely located server, for example in a cloud environment or in a data center. The data processing device 120 typically stores information received from the sensors along the industrial treatment line in order to build a database of values and provide a complete overview of the changes in the parameters of items 250-257 transiting in each processing module 20, 30, 40, 50, 60, 70 of the industrial treatment line 100. This enables the generation of reports pointing out extreme values in the external parameters of the items 250-257 and can also be used to calculate the amount of time spent by items 250-257 in the industrial treatment line 100 and the amount of resources and/or energy consumed in order to apply a treatment to these items 250-257.

Resources consumed can for example include the volume of cleaning agents dispensed per item 250-253, the duration during which spraying units dispensing a treatment to the items were switched on, the number of spraying units that were activated per item, the time spent by an item in each processing module 20, 30, 40, 50, 60, 70.

Energy can for example include the number of watts or watthours of electricity consumed per item 250-257 at each processing module 20, 30, 40, 50, 60, 70, the number of Joules spent changing the temperature in a processing module 20, 30, 40, 50, 60, 70.

The data processing device 120 has access to a database which comprises a correlation between a set of value ranges for values of the parameter representative of the external property of the item 250-257, measured by sensor 201, the first sensor 202 or the third sensor 203, and associated settings for a value of a working parameter in the processing module 20, 30, 40, 50, 60, 70. This correlation can be either received or input by a user or accessed by other means, for example retrieved from a database. The corresponding database can also be dynamically updated by storing information from other similar processing modules in other industrial treatment lines, in order to enable a smart update of the database and the improvement of the sets of value ranges defined for different values of the parameter representative of an external property of the item 250-257.

The combination of the data processing device 120 and at least one of the sensors 201, the first sensor 202 and/or the third sensor 203 and/or the second sensor 110 forms a system 200 configured to apply an optimized processing treatment to items in an industrial treatment line.

In the example represented in FIG. 2, the treatment that is applied to the items 252-255 is a cleaning treatment inside a bath 36. This bath comprising cleaning agents 38 the concentration of which and the content of which can be adapted by opening and closing valves of dispensing unit 37. The mechanism activating the dispensing unit 37 can be controlled by signals sent from the data processing device 120.

Data processing device 120 is configured to further identify which value range from the set of value ranges from databases or from user input comprises the measured value provided by the sensor 201, the first sensor 212 and/or the second sensor 110 and to determine the associated setting for the value of the working parameter in the processing module 20, 30, 40, 50, 60, 70. If the current setting of the working parameter differs from the one that is identified for the measured value of the parameter representative of an external property of the item 250-257, the data-processing device 120 outputs an instruction to the processing module 20, 30, 40, 50, 60, 70 to change the current setting to the associated setting that is determined to be suitable for the measured value received from the sensor or sensors.

In the example of FIG. 2, item 252 is seen to comprise more dirty areas 16 on its surface than other items 250, 251, 253-257. Therefore, it can be assumed that cleaning item 252 would require a more intensive treatment, which could involve either a higher temperature within the bath 36 and/or a higher concentration of cleaning agent, or a different concentration of cleaning agent which can be adjusted by activating corresponding valves at dispensing units 37. Based on the information provided by first sensor 202, control unit 120 can decide to change the setting of either or both working parameters (the temperature inside processing module 30 and/or the activation of the dispensing units 37) in order to apply a more intensive treatment to item 252.

Advantageously, the setting of the working parameter is changed upon determining that the current setting does not enable treating an item 250-257 with sufficient savings of resources while at the same time also reaching a preset quality of the treatment. The quality of the treatment can for example be set as a percentage of defects that are removed from the item 250-257, such as less than 10 or less than 5 stains or soilings on the surface of the item 250-257. A quality can also be seen as a difference in the value of the parameter representative of an external surface of the item 250-257 across the external surface of the item 250-257 that is less than 25% or less than 10% or less than 5% or less than 1% of the maximum value of that parameter measured on the surface of the item. A quality of the treatment can also be seen as a difference in the value of the parameter with respect to the value measured on a refence item that is less than 25% or less than 10% or less than 5% or less than 1%.

According to an embodiment, the change of the settings upon determining that the current setting does not enable treating one item in the industrial treatment line with sufficient savings of resources while also reaching a preset quality of the treatment can be implemented in different ways and can also be triggered by additional conditions in the processing module 20, 30, 40, 50, 60, 70.

Generally, the properties of items 250-257 are substantially identical. It can therefore be advantageous to perform the measurement of the parameter representative of an external property of items 250-257 only from time to time, or at predetermined time intervals. The predetermined time intervals can for example be every minute, every 10 minutes or every hour. This logic will ensure that, if the data processing device 120 triggers the change of the setting of the working parameter automatically upon determining a difference between a recommendable setting and a current setting, this change does not happen too frequently, in particular not for each item. It could be considered that a frequent change in the settings of the working parameter would lead to an increase in the energy used to steer the processing modules 20, 30, 40, 50, 60, 70.

A less frequent measurement of the value of the parameter representative of an external parameter of the item can in particular be implemented when the variations in the values of the external parameters are identified, for example from previous measurements, to occur on longer time scales. This may happen for example if humidity or weather patterns influence the dirtiness level of the items. A measurement every day could be sufficient to adapt the settings of the working parameter of the processing module to compensate for these effects. Alternatively, for conditions affecting the value of the external parameter on shorter time scales or randomly (such as defects during the manufacturing phase) a more frequent measurement is preferred.

Alternatively, the triggering of the change of setting of the value of the working parameter can also occur only if the difference between the recommended (associated) setting and the current setting is substantial. A difference could be considered as being "substantial" if the value of the recommended (associated) setting is more than 25% higher or lower than a value of at least one working parameter in the current setting.

It is also possible, however, to change the setting of the working parameter as soon as an associated setting differs from a current setting, and to measure the value of the parameter representative of the external property of items 250-257 for each item in the industrial treatment line 100.

A further embodiment of the present disclosure is also illustrated in FIG. 2. After exiting the bath, a third sensor 203 optionally with a light source 213 is arranged in order to measure the value of the parameter representative of an external property of the item 256 after application of the treatment. The third sensor 203 can be arranged either inside the processing module 30 or outside of it. The measurement provided by the third sensor 203 can be compared to the value determined by the first sensor 201 for the same item, in order to check whether the expected quality of the treatment was reached or not.

In the example of item 257, there are no more soilings on its surface. It can be assumed that an expected quality of the treatment, also referred to as a target quality, has been reached. As a result, item 257 is directed further down 3 along the industrial treatment line 100 towards the next processing module 40. In the case of item 256, some soiling is still present on the external surface of the item 256, which might be interpreted as a sign that the item 256 needs further treatment. One possibility offered by the present disclosure in an optional embodiment is to redirect 4 item 256 back upstream from processing module 30 in order to apply the treatment administered in processing module 30 once again.

Identification means 15 of each item 250-257 can be used to count the number of times one item has been redirected back to the beginning of the processing module via a feedback channel 35, in order to avoid creating long treatment times in case some soilings or some defects on the items 250-257 cannot be removed by the treatment applied in the processing module 30. Identification means 15 can be used to track and store the history of the treatment applied to an item 250-257 at processing module 30 as well as in every step of the industrial treatment line 100.

According to further embodiments, the database which comprises a correlation between a set of value ranges for values of the parameter representative of the external property of the item 250-257 and associated settings for a value of a working parameter can be updated by the user, or based on feedback provided by the user. The feedback concerns the quality of the processing treatment. It can also be an efficiency of the processing treatment which can for example be estimated by comparing values provided by the first sensor 201 and third sensor 203, and see how the measurement of the third sensor corresponds with the values of the target quality.

By comparing the values measured before entering the processing module 20, 30, 40, 50, 60, 70 and after application of the treatment, it is possible to determine whether the correlation established between a set of value ranges and associated settings needs to be updated. A dynamic update of charts linking sets of value ranges for values of the parameter representative of the external property of the item 250-257 and associated settings for a value of a working parameter can advantageously be put in place.

According to further embodiments, and in particular when two or more than two parameters representative of an external property of the items are measured, the correlation between sets of value ranges for values of these groups of parameters and associated settings for a value of a working parameter can be further determined with the help of a machine learning algorithm. The machine learning algorithm can in particular use previous observations on the quality of treatments observed with certain settings of the working parameter and find the most suitable setting for the working parameter (or likewise, for the working parameters if there are two or more than two working parameters that are controllable in the processing module). The machine learning approach can then generate a model that predictively associates for each combination of values for the measurable parameters representative of an external property of the items an associated group of working parameters that are deemed to be the best fit to reach the target quality while reducing or minimizing resources and/or energy consumption. This approach is preferred in order to obtain reliable values for the settings of the working parameter even for combinations of values of parameters representative of an external property of the items for which no experimental data is yet available.

The description provided above can be applied to any processing module 20, 30, 40, 50, 60, 70 in the industrial treatment line 100.

As further shown in FIG. 1, a further treatment such as application of a coating layer can be applied at processing module 40, for example via dispensing of a coating material from a dispensing unit 41.

Item 151 thus coated is then ready for another mechanical processing at processing module 50.

Item 152 thus polished or reshaped can be subjected to another cleaning treatment at processing module 60. Processing module 60 can be substantially similar to processing module 30 and comprise for example dispensing units 61 applying some cleaning agents onto item 153 to clean it. Should the value measured for the parameter representative of an external property of item 152 indicate that no further cleaning treatment is required, item 153 can be redirected directly to a processing module 70 via a by-pass channel 65 without entering processing module 60.

Processing module 70 can for example be a polishing or cleaning step involving deposition of a shininess enhancing agent or a protective coating layer. It can also be a step during which a package is wrapped around item 154. Deposition of cleaning agents or of a protective coating can be done via a dispensing unit 71.

Although the above method and system have been described in the context of the treatment of car wheel rims, it is understood that similar methods can be applied on any industrial treatment line 100, in any other type of industry which applies treatments to items or parts. One example can be the post-processing of 3D printed objects.

Figure 3:
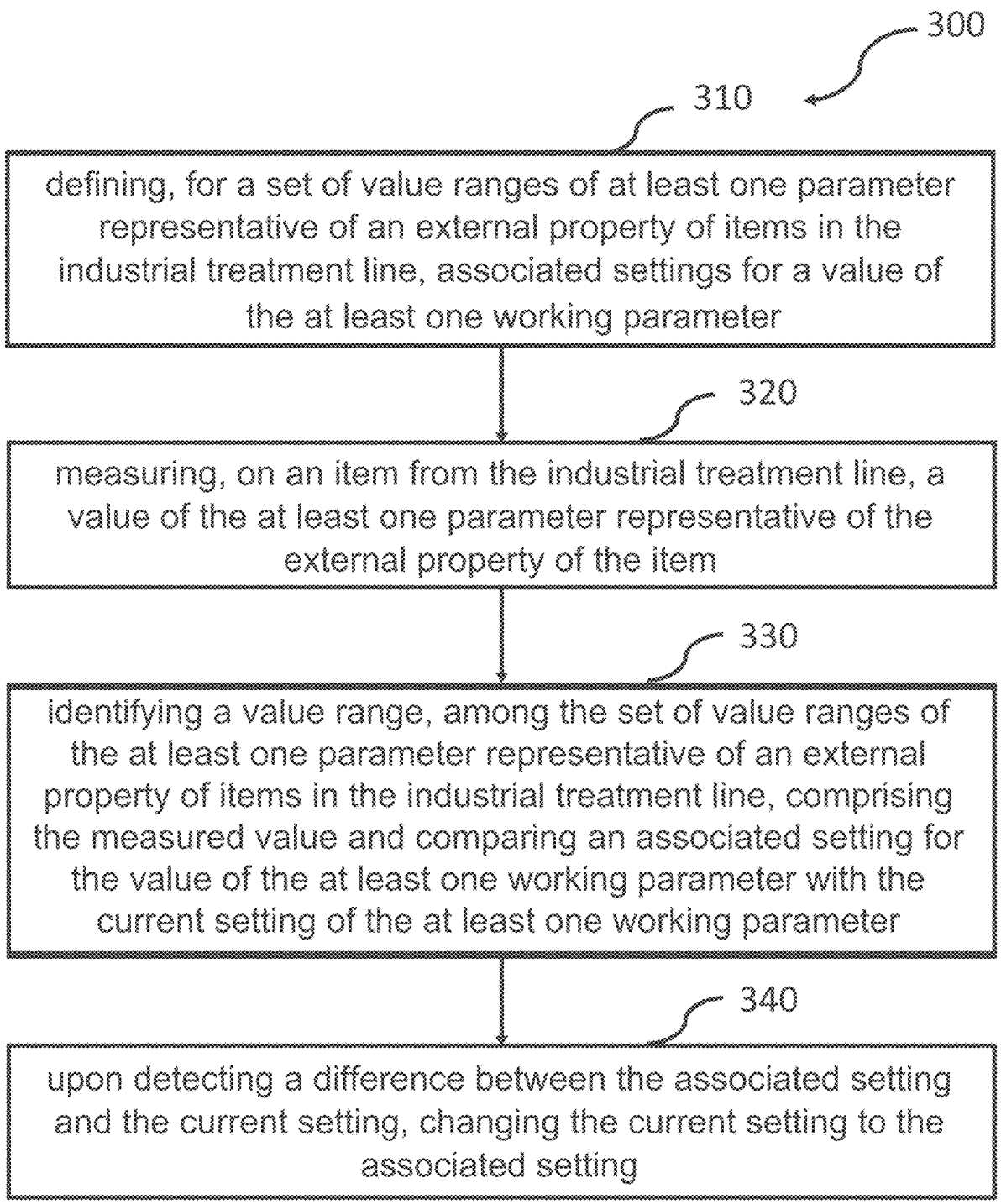
FIG. 3 shows a simplified workflow of a method according to an exemplary embodiment.

The flowchart of FIG. 3 summarizes some steps of the method 300 of the present disclosure.

First, the method defines 310, for a set of value ranges of at least one parameter representative of an external property of items in the industrial treatment line, associated settings for a value of the at least one working parameter, each associated setting corresponding to a setting compatible with an achievement of a target quality of the processing treatment and wherein the setting involves a consumption of resources and/or energy at the at least one processing module that is lower than a maximum consumption of resources and/or energy obtained for an extreme setting of the at least one working parameter.

Secondly, the method measures 320, on an item from the industrial treatment line, a value of the at least one parameter representative of the external property of the item.

Then, the method identifies 330 a value range, among the set of value ranges of the at least one parameter representative of an external property of items in the industrial treatment line, comprising the measured value and comparing an associated setting for the value of the at least one working parameter with the current setting of the at least one working parameter. Finally, the method changes 340 the current setting to the associated setting upon detecting a difference between the associated setting and the current setting.

FURTHER EXAMPLES

During manufacturing, an item can be subjected to a mechanical processing step in a processing module. A camera takes pictures of the items before and/or after the mechanical treatment is applied in order to compare the pictures taken (for example using an infrared camera) to pictures of reference items void of any defects. A comparison of both pictures can focus on a counting of the number of pores/holes or the number and or percentage of areas void of coating on an external surface of the item.

Based on the information thus extracted on the type and number of defects of each item, values for working parameters can be set at each processing module downstream along the industrial treatment line, to generate suitable "current" or starting working parameters. This in particular involves preparing cleaning baths, setting suitable temperatures to optimize the processing steps that will follow.

As items are kept in the storage area, optical sensors (for example ultra violet or infrared cameras) can measure the percentage of dirt or soilings on the external surface of items. A value corresponding to the dirtiness per unit area is calculated in order to adapt the working parameters in the processing modules. For the cleaning module, if the dirtiness per unit area of a batch of items is above a threshold value of 20% of the total external surface area of the items, an ultrasound source placed in the bath of the processing module, adapted to enhance stripping off of soilings or other types of dirt deposits on the external surface of items, is switched on in the cleaning bath in order to improve the efficiency of the cleaning. For a dirtiness per unit area below this value, the ultrasound source is switched off.

The cleaning module can further associate a frequency of the dispensing of a cleaning fluid under pressure and/or the pressure of this fluid on the external surface of the items with the values of dirtiness per unit area measured by the first sensor.

For example, when the dirtiness per unit area of a batch of items or of an item is above 20% of the total external surface area of the item, the pressure can be set at 3 hPa (3 bars) instead of 1 hPa (1 bar).

A measurement of the concentration of carbon on the external surface of the item is also taken. If the concentration is above 20 mg/m$^2$, the ultrasound source is activated. Otherwise it is switched off.

In a second example, soilings on the external surface of an item which is a part made of aluminum are measured as dirtiness per unit area in grams of carbon per square meters. Three ranges are defined: level of dirtiness is considered to be low for values lower than 1 g carbon/m$^2$, medium for values ranging between 1 g carbon/m² and 3 g carbon/m², and high for values above 3 g carbon/m². The detection of this carbon is done with an optical source illuminating the item and a detector measuring the reflected and/or scattered light from the item or via pyrolytic decomposition of organic contaminations and subsequent determination of the TOC (Total Organic Carbon) content.

The following table summarizes the set of value ranges and associated settings for the concentration of that agent in the bath.

TABLE 1 chart linking dirtiness levels on a part made of aluminum and concentration of an alkali agent in a cleaning bath.

| Dirtiness level | Concentration of cleaning agent in the bath |
|---|---|
| <1 g carbon/m² | 1% |
| Between 1 g carbon/m² and 3 g carbon/m² | 2.5% |
| >3 g carbon/m² | 5% |

The agent is put inside a solvent such as typically water. Further additives can be included to change the hardness or pH of the solution inside the bath.

The steps of the examples and embodiments described above can be implemented by a processor such as a computer. A computer program product comprising steps of the above-described method can be used to implement the method on a computer.

It is possible to store a computer program comprising instructions to implement the method of the present disclosure on different non-transitory computer readable storage mediums. These could for example comprise a processor or chip, FPGA (field programable gate array), an electronic circuit comprising several processors or chips, a hard drive, a flash or SD card, a USB stick, a CD-ROM or DVD-ROM or Blue-Ray disc, or a diskette.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A method for applying an optimized processing treatment to items in an industrial treatment line, the industrial treatment line comprising at least one processing module applying a processing treatment to the items, the processing treatment being at least in part parameterized by a current setting of at least one working parameter of the at least one processing module, the method comprising:
    (a) defining, for a set of value ranges of at least one parameter representative of an external property of items in the industrial treatment line, associated settings for a value of the at least one working parameter, each value range being associated with an associated setting and wherein each associated setting corresponds to a setting compatible with an achievement of a target quality of the processing treatment;
    (b) measuring, on an item in the industrial treatment line, a value of the at least one parameter representative of the external property of the item using at least one first sensor;
    (c) measuring a value of a parameter representative of a condition inside the at least one processing module using at least one second sensor;
    (d) identifying, using a data processing device, a value range, among the set of value ranges of the at least one parameter representative of an external property of items in the industrial treatment line, comprising the measured value supplied by the at least one first sensor and the measured value supplied by the at least one second sensor, and comparing an associated setting for the value of the at least one working parameter with the current setting of the at least one working parameter; and
    (e) upon detecting a difference between the associated setting and the current setting, changing the current setting to the associated setting,
    wherein each associated setting further corresponds to a setting for which a lowest achievable consumption of resources and/or energy at the at least one processing module is achieved.

2. The method of claim 1, wherein the current setting is changed to the associated setting upon further determining that the value of the working parameter in the current setting differs by more than 25% from the value of the working parameter in the associated setting.

3. The method of claim 1, wherein a value of the at least one parameter representative of the external property of items is measured for each item in the industrial treatment line.

4. The method of claim 1, wherein the parameter representative of an external property of items at least one of:
    a size of the item;
    a shape of the item;
    a color of the item;
    a level of corrosion of a surface of the item;
    a level of dirtiness of the surface of the item;
    a shininess of the item;
    a number of structural differences identified on the item compared to a reference exemplary of the item;
    a concentration of metal deposited on the surface of the item; and
    a thickness of a coating layer on the surface of the item.

5. The method of any one of the preceding claims, wherein the at least one working parameter is at least one of:
    a duration of the processing treatment applied to the item in the at least one processing module;
    a temperature applied to the item in the at least one processing module;

a concentration of at least one cleaning agent in a bath inside the at least one processing module;
a pressure exerted by a fluid onto the item inside the at least one processing module;
an amount of dispensing units activated for dispensing a cleaning agent onto the item inside the at least one processing module.

6. The method of claim 1, wherein the industrial treatment line further comprises a storage area for storing the items, the method further comprising:
measuring a value of a parameter representative of a condition inside the storage area;
defining, for a set of value ranges of the parameter representative of the condition, corresponding settings for a value of the at least one working parameter;
identifying a value range, among the set of value ranges of the parameter representative of the condition, comprising the measured value of the parameter representative of the condition inside the storage area and comparing the corresponding setting with the current setting; and
upon detecting a difference between the corresponding setting and the current setting, changing the current setting to the corresponding setting.

7. The method of claim 6, wherein the parameter representative of a condition inside the storage area is at least one of:
a humidity level inside the storage area, to which items are exposed;
an atmospheric pressure;
a time spent by the items inside the storage area;
a temperature inside the storage area; and
presence and/or concentration of pollutants in the storage area.

8. The method of claim 1, further comprising:
defining item categories for the items in the industrial treatment line based on the set of value ranges of at least one parameter representative of an external property of the items in the industrial treatment line, each value range being associated with a corresponding item category;
prior to entering the treatment module, grouping each item from the industrial treatment line into a corresponding item category based on a measured value for the at least one parameter representative of the external property of the item;
selecting an item category and setting the at least one working parameter to a value within the value range associated with the selected item category; and
directing items belonging to the selected item category into the at least one processing module.

9. The method of claim 1, further comprising:
obtaining a target range of values for the value of the at least one parameter representative of the external property of the item;
measuring, downstream from the processing module, the value of the at least one parameter representative of the external property of the item;
comparing the measured value to the target range of values; and
upon detecting that the measured value is outside of the target range of values, directing the item into the at least one processing module to repeat steps (b) to (d).

10. A system for applying an optimized processing treatment to items in an industrial treatment line, the industrial treatment line comprising at least one processing module applying a processing treatment to the items, the processing treatment being at least in part parameterized by a current setting of at least one working parameter of the at least one processing module, the system comprising:
at least one first sensor configured to measure, on an item from the industrial treatment line, a value of the at least one parameter representative of the external property of the item;
at least one second sensor configured to measure a value of a parameter representative of a condition inside the at least one processing module;
at least one data processing device configured to receive the measured value supplied from the at least one first sensor and the measured value supplied from the at least one second sensor and configured to:
(a) receive and/or store input defining, for a set of value ranges of at least one parameter representative of an external property of items in the industrial treatment line, associated settings for a value of the at least one working parameter, each value range being associated with an associated setting and wherein each associated setting corresponds to a setting compatible with an achievement of a target quality of the processing treatment;
(b) identify a value range, among the set of value ranges of the at least one parameter representative of an external property of items in the industrial treatment line, comprising the measured value supplied by the at least one first sensor and the measured value supplied by the at least one second sensor;
(c) compare an associated setting for the value of the at least one working parameter to the current setting of the at least one working parameter; and
(d) upon detecting a difference between the associated setting and the current setting, outputting an instruction to change the current setting to the associated setting at the at least one processing module,
wherein each associated setting further corresponds to a setting for which a lowest achievable consumption of resources and/or energy at the at least one processing module is achieved.

11. The system of claim 10, further comprising:
a storage area for storing items prior to entering the at least one processing module;
at least one third sensor configured to measure a value of a parameter representative of a condition inside the at least one processing module storage area.

12. The system of claim 10, further comprising:
a by-pass channel configured to direct items from the industrial treatment line away from the at least one processing module upon determining that the items belong to an item category incompatible with the at least one working parameter set for the at least one processing module.

13. The system of claim 10, further comprising:
at least one third sensor arranged on the treatment line downstream from the at least one processing module, the at least one third sensor measuring the value of the at least one parameter representative of the external property of the item downstream from the at least one processing module;
a feedback channel configured to redirect items from the industrial treatment line back into the at least one processing module upon determining that the value measured by the at least one third sensor is outside of a target range of values.

14. A non-transitory computer readable storage medium having stored thereon a computer program comprising instructions for execution, by at least one data processing device, of a method for applying an optimized processing treatment to items in an industrial treatment line, the industrial treatment line comprising at least one processing module applying a processing treatment to the items, the processing treatment being at least in part parameterized by a current setting of at least one working parameter of the at least one processing module, the method comprising:

(a) receiving instructions defining, for a set of value ranges of at least one parameter representative of an external property of items in the industrial treatment line, associated settings for a value of the at least one working parameter, each value range being associated with an associated setting and wherein each associated setting corresponds to a setting compatible with an achievement of a target quality of the processing treatment, wherein each associated setting further corresponds to a setting for which a lowest achievable consumption of resources and/or energy at the at least one processing module is achieved;

(b) receiving a measurement of a value of the at least one parameter representative of the external property of an item from the industrial treatment line and a measurement of a value of a parameter representative of a condition inside the at least one processing module;

(c) identifying a value range, among the set of value ranges of the at least one parameter representative of an external property of items in the industrial treatment line, comprising the measured value supplied by the at least one first sensor and the measured value supplied by the at least one second sensor, (d) comparing an associated setting for the value of the at least one working parameter the current setting of the at least one working parameter; and (e) upon detecting a difference between the associated setting and the current setting, outputting an instruction to change the current setting to the associated setting at the at least one processing module.

* * * * *